No Printed Specification Available
9679X
P. Quimby,
Permutation Lock.
Patented May 23, 1836.
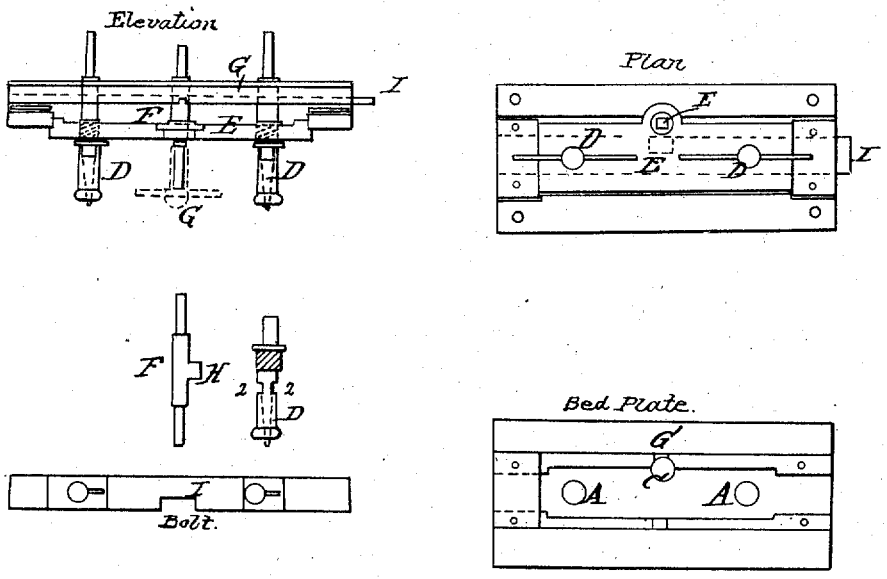
THE NORRIS PETERS CO., WASHINGTON, D. C.

Phineas P. Quimby of Belfast. Maine.

Letters Patent,

The schedule referred to in these Letters Patent and making part of the same, containing a description in the words of the said Phineas P. Quimby himself of his improvement in the construction of Locks for the fastening of Doors, Chests, Drawers &c.

To all persons to whom these presents shall come —
Be it known that I, Phineas P. Quimby of Belfast in the County of Waldo, & State of Maine have invented & made a new and useful improvement in the construction of Locks, for Doors, Chests, Drawers, &c. & the same have made constructed & applied to use, & which operates upon a principle heretofore unused and unknown, called the "Combination Screw Lock" specified in the words following, viz.
The Lock in addition to the case in which it is enclosed, & which may be in the shape of a door, chest, drawer, or padlock, consists of a bolt or bolts with two or more holes through it, through which two or more screws are to pass. connected with said holes in the bolt are two or more slits in the bolt to receive the screws, at the places in the same screws which are grooved; also two or more screws, with one or more grooves in them to admit of their passing into the slits in the bolt: the bolt to contain a mortice or gap in which the key plays; the bolt to be impelled with or without a spring. — in order to place the bolt in a situation to be moved. The screws must be raised or lowered untill the grooves in the screws come in a line with the slits in the bolt. After the bolt is moved a turn of the screws, either or all of them more or less times, prevents the movement of the bolt, untill the screws are restored to the position in which they were before they were started. In the drawing which is herewith transmitted the holes marked A, are those through which the screws pass. The 190. 9677X hole marked C, is the key hole; B. the bolt. What I particularly and specifically claim as my own invention and for which I ask an exclusive right to use is - 1st. the constructing of locks either of wood or metal with bolts containing one or more holes or slits for the reception of screws with grooves in them, 2d. The application of screws to said bolts in such way & manner, as to impede & prevent the movement of the bolt, in some positions & not to impede or prevent it in others, —

In testimony that the above is a true specification of the improvement I have invented & claim a patent for, under the name of the "Combination Screw Lock" as above named I have hereunto set my hand this thirty first day of March A.D. 1836 —

Witnesses
C. F. Angier
W. G. Crosby

Phineas P. Quinby

[illegible]
[illegible]

520 [illegible]

Drawing